United States Patent
Patel et al.

(10) Patent No.: US 7,411,717 B2
(45) Date of Patent: Aug. 12, 2008

(54) MICROMIRROR DEVICE

(75) Inventors: Satyadev Patel, Palo Alto, CA (US); Andrew Huibers, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/256,035

(22) Filed: Oct. 21, 2005

(65) Prior Publication Data
US 2006/0033977 A1    Feb. 16, 2006

Related U.S. Application Data

(63) Continuation-in-part of application No. 10/437,776, filed on May 13, 2003, now Pat. No. 7,099,065, which is a continuation-in-part of application No. 10/366,297, filed on Feb. 12, 2003, now Pat. No. 6,867,897.

(51) Int. Cl.
G02B 26/00 (2006.01)

(52) U.S. Cl. .................. 359/290; 359/223; 359/224; 359/291; 359/292; 359/295; 359/298; 345/85; 345/108; 353/99; 353/37; 348/771

(58) Field of Classification Search .............. 359/223, 359/224, 290–295, 298; 345/85, 108; 353/37, 353/99; 348/750, 755, 770, 771
See application file for complete search history.

(56) References Cited

U.S. PATENT DOCUMENTS

| | | |
|---|---|---|
| 3,746,911 A | 7/1973 | Nathanson et al. |
| 4,229,732 A | 10/1980 | Hartstein et al. |
| 5,216,537 A | 6/1993 | Hornbeck |
| 5,311,360 A | 5/1994 | Bloom et al. |
| 5,523,878 A | 6/1996 | Wallace et al. |
| 5,659,374 A | 8/1997 | Gale et al. |
| 5,661,591 A | 8/1997 | Lin et al. |
| 5,739,941 A | 4/1998 | Knipe et al. |
| 5,781,331 A | 7/1998 | Carr et al. |
| 5,835,256 A | 11/1998 | Huibers |
| 5,898,515 A | 4/1999 | Furlani et al. |
| 6,046,840 A * | 4/2000 | Huibers ............... 359/291 |

(Continued)

OTHER PUBLICATIONS

Alvelda, P., "20.2: High-Efficiency Color Microdisplays," SID International Symposium, Digest of Technical Papers, May 1995, pp. 307-310.

(Continued)

*Primary Examiner*—Evelyn A. Lester
(74) *Attorney, Agent, or Firm*—W. James Brady, III; Frederick J. Telecky, Jr.

(57) ABSTRACT

A spatial light modulator comprises an array of micromirror devices each of which has a reflective and deflectable mirror plates. The mirror plates are moved between an ON and OFF state during operation, wherein the OFF state is a state wherein the mirror plate is not parallel to the substrate on which the mirror plate is formed. The micromirror device may have an ON state stopper for limiting the rotation of the mirror plate at the ON state angle, but does not have an OFF state stopper. The non-zero OFF state is achieved by attaching the mirror plate to a deformable hinge held by a hinge support that is curved at the natural resting state.

40 Claims, 11 Drawing Sheets

U.S. PATENT DOCUMENTS

| | | | |
|---|---|---|---|
| 6,067,183 A | 5/2000 | Furlani et al. | |
| 6,071,752 A | 6/2000 | Furlani et al. | |
| 6,172,797 B1 * | 1/2001 | Huibers | 359/291 |
| 6,290,864 B1 | 9/2001 | Patel et al. | |
| 6,312,134 B1 | 11/2001 | Jain et al. | |
| 6,351,330 B2 | 2/2002 | Ko et al. | |
| 6,388,661 B1 | 5/2002 | Richards | |
| 6,396,619 B1 * | 5/2002 | Huibers et al. | 359/291 |
| 6,396,620 B1 | 5/2002 | Goodwin-Johansson | |
| 6,433,917 B1 | 8/2002 | Mei et al. | |
| 6,512,625 B2 | 1/2003 | Mei et al. | |
| 6,529,310 B1 | 3/2003 | Huibers et al. | |
| 6,552,840 B2 * | 4/2003 | Knipe | 359/291 |
| 6,741,383 B2 * | 5/2004 | Huibers et al. | 359/291 |
| 6,744,550 B2 * | 6/2004 | Neukermans et al. | 359/291 |
| 6,867,897 B2 | 3/2005 | Patel et al. | |
| 6,885,494 B2 * | 4/2005 | Patel et al. | 359/291 |
| 6,949,202 B1 | 9/2005 | Patel et al. | |
| 6,958,123 B2 | 10/2005 | Reid et al. | |
| 6,960,305 B2 * | 11/2005 | Doan et al. | 216/2 |
| 6,962,419 B2 * | 11/2005 | Huibers | 353/99 |
| 6,970,280 B2 * | 11/2005 | Patel et al. | 359/290 |
| 6,975,444 B2 * | 12/2005 | Huibers | 359/291 |
| 6,992,810 B2 * | 1/2006 | Pan et al. | 359/290 |
| 7,009,754 B2 * | 3/2006 | Huibers | 359/291 |
| 7,012,733 B2 * | 3/2006 | Huibers | 359/291 |
| 7,023,607 B2 * | 4/2006 | Huibers | 359/291 |
| 7,027,207 B2 * | 4/2006 | Huibers | 359/291 |
| 7,031,045 B2 * | 4/2006 | Neukermans et al. | 359/291 |
| 7,057,246 B2 | 6/2006 | Reid | |
| 7,099,065 B2 * | 8/2006 | Patel et al. | 359/291 |
| 2003/0025982 A1 * | 2/2003 | Wang et al. | 359/290 |

OTHER PUBLICATIONS

Baumann, E., "The Fischer Large-Screen Projection System," Journal of the SMPTE, vol. 60, Apr. 1953, pp. 344-356.

Mehregany, M., et al., "SiC MEMS: Opportunities and Challenges for Applications in Harsh Environments," Thin Solid Films, vol. 355-356, 1999, pp. 518-524.

Petersen, K.E., "Micromechanical Light Modulator Array Fabricated on Silicon," Applied Physics Letters, vol. 31, No. 8, Oct. 15, 1977, pp. 521-523.

* cited by examiner

"Off"-state

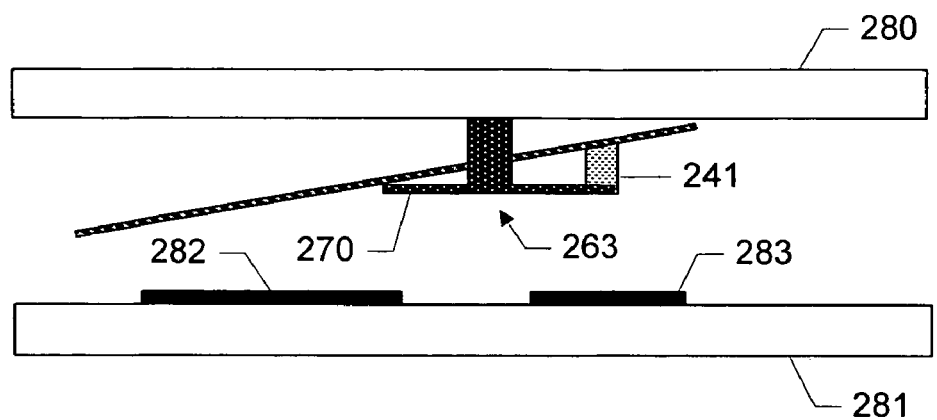
FIG. 4C    "ON"-state
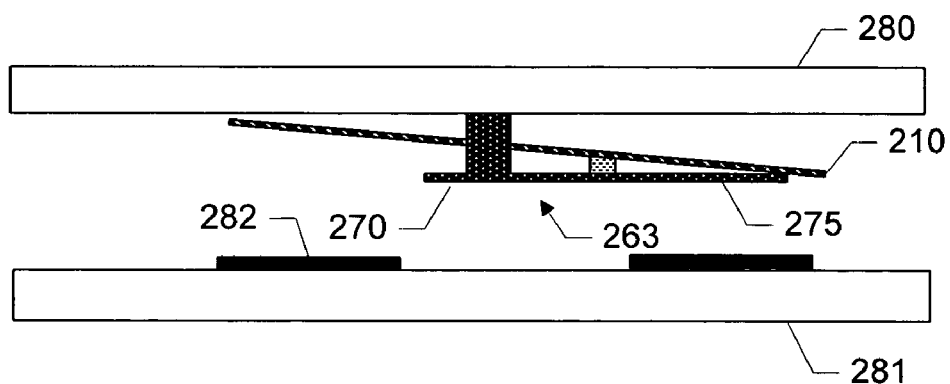
FIG. 4D    "Off"-state
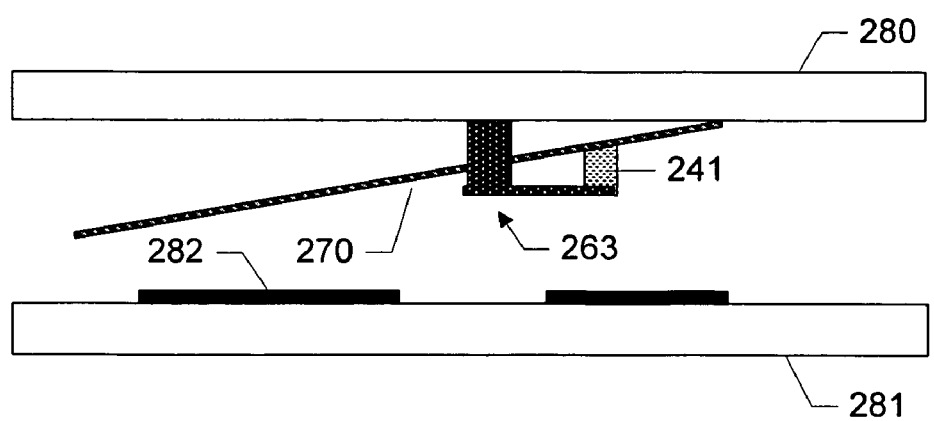
FIG. 4E    "ON"-state

MICROMIRROR DEVICE

CROSS-REFERENCE TO RELATED CASES

This application is a continuation-in-part of U.S. patent application Ser. No. 10/437,776 filed May 13, 2003 (now U.S. Pat. No. 7,099,065 issued Aug. 29, 2006), which is a continuation-in-part of U.S. patent application Ser. No. 10/366,297 to Patel filed Feb. 12, 2003 (now U.S. Pat. No. 6,867,897 issued Mar. 15, 2005). The subject matter of each is incorporated herein by reference in entirety.

TECHNICAL FIELD OF THE INVENTION

The present invention is related generally to spatial light modulators, and, more particularly, to fabrications of spatial light modulators with hinge structures.

BACKGROUND OF THE INVENTION

Spatial light modulators (SLMs) are transducers that modulate an incident beam of light in a spatial pattern in response to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

An early SLM designed for use in a projection display system is described by Nathanson, U.S. Pat. No. 3,746,911. The individual pixels of the SLM are addressed via a scanning electron beam as in a conventional direct-view cathode ray tube (CRT). Instead of exciting a phosphor, the electron beam charges deflectable reflective elements arrayed on a quartz faceplate. Elements that are charged bent towards the faceplate due to electrostatic forces. Bent and unbent elements reflect parallel incident light beams in different directions. Light reflected from unbent elements is blocked with a set of Schlieren stops, while light from bent elements is allowed to pass through projection optics and form an image on a screen. Another electron-beam-addressed SLM is the Eidophor, described in E. Baumann, "The Fischer large-screen projection system (Eidophor)" 20 J.SMPTE 351 (1953). In that system, the active optical element is an oil film, which is periodically dimpled by the electron beam so as to diffract incident light. A disadvantage of the Eidophor system is that the oil film is polymerized by constant electron bombardment and oil vapors result in a short cathode lifetime. A disadvantage of both of these systems is their use of bulky and expensive vacuum tubes.

A SLM in which movable elements are addressed via electrical circuitry on a silicon substrate is described in K. Peterson, "Micromechanical Light Modulator Array Fabricated on Silicon" 31 Appl. Phys. Let. 521 (1977). This SLM contains a 16 by 1 array of cantilever mirrors above a silicon substrate. The mirrors are made of silicon dioxide and have a reflective metal coating. The space below the mirrors is created by etching away silicon via a KOH etch. The mirrors are deflected by electrostatic attraction: a voltage bias is applied between the reflective elements and the substrate and generates an electrostatic force. A similar SLM incorporating a two-dimensional array is described by Hartstein and Peterson, U.S. Pat. No. 4,229,732. Although the switching voltage of this SLM is lowered by connecting the deflectable mirror elements at only one corner, the device has low light efficiency due to the small fractional active area. In addition, diffraction from the addressing circuitry lowers the contrast ratio (modulation depth) of the display.

Another SLM design is the Grating Light Value (GLV) described by Bloom, et. al., U.S. Pat. No. 5,311,360. The GLV's deflectable mechanical elements are reflective flat beams or ribbons. Light reflects from both the ribbons and the substrate. If the distance between surface of the reflective ribbons and the reflective substrate is one-half of a wavelength, light reflected from the two surfaces adds constructively and the device acts like a mirror. If this distance is one-quarter of a wavelength, light directly reflected from the two surfaces will interfere destructively and the device will act as a diffraction grating, sending light into diffracted orders. Instead of using active semiconductor circuitry at each pixel location, the approach in the '360 patent relies on an inherent electromechanical bistability to implement a passive addressing scheme. The bistability exists because the mechanical force required for deflection is roughly linear, whereas the electrostatic force obeys an inverse square law. As a voltage bias is applied, the ribbons deflect. When the ribbons are deflected past a certain point, the restoring mechanical force can no longer balance the electrostatic force and the ribbons snap to the substrate. The voltage must be lowered substantially below the snapping voltage in order for the ribbons to return to their undeflected position. Ceramic films of high mechanical quality, such as LPCVD (low pressure chemical vapor deposition) silicon nitride, can be used to form the ribbons. However, there are several difficulties with the GLV. A problem is that a passive addressing scheme might not be able to provide high frame rates (the rate at which the entire SLM field is updated). In addition, with a passive addressing scheme, the ribbons deflect slightly even when off. This reduces the achievable contrast ratio. Also, even though the device is substantially planar, light is scattered, as in the DMD, from areas between the pixels, further reducing the contrast ratio.

Another diffraction-based SLM is the Microdisplay, described in P. Alvelda, "High-Efficiency Color Microdisplays" 307 SID 95 Digest. That SLM uses a liquid crystal layer on top of electrodes arrayed in a grating pattern. Pixels can be turned on and off by applying appropriate voltages to alternating electrodes. The device is actively addressed and potentially has a better contrast ratio than the GLV. However, the device, being based on the birefringence of liquid crystals, requires polarized light, reducing its optical efficiency. Furthermore, the response time of liquid crystals is slow. Thus, to achieve color, three devices—one dedicated for each of the primary colors—must be used in parallel. This arrangement leads to expensive optical systems.

A silicon-based micro-mechanical SLM with a large fractional optically active area is the Digital Mirror Device (DMD), developed by Texas Instruments and described by Hornbeck, U.S. Pat. No. 5,216,537 and other references.

Therefore, what is needed is a spatial light modulator that has a high resolution, a high fill factor and a high contrast ratio. What is further needed is a spatial light modulator that does not require polarized light, hence is optically efficient and mechanically robust.

SUMMARY OF THE INVENTION

In one embodiment of the invention, a reflective micromirror is disclosed. The micromirror comprises: a hinge; and a micromirror plate having a diagonal, attached to the hinge such that the micromirror plate can pivot along a rotation axis that is parallel to, but off-set from the diagonal of the micromirror plate.

In another embodiment of the invention, a method for making a micromirror device is provided. The method comprises: providing a substrate; depositing a first sacrificial layer; forming a micromirror plate having a diagonal; depositing a second sacrificial layer; forming a hinge-structure on the substrate for holding the micromirror plate above the substrate such that the micromirror plate can pivot along a rotation axis that is parallel to, but off-set from the diagonal of the micromirror plate; and removing the first and second sacrificial layers.

In yet another embodiment of the invention, a reflective micromirror device is disclosed herein. The micromirror device comprises: a substrate; a micromirror plate having a diagonal, formed above the substrate for reflecting an incident light; and a hinge-structure formed on the substrate for holding the micromirror plate, wherein the hinge-structure further comprises: a hinge, that is attached to the micromirror plate such that the micromirror plate can pivot along the a rotation axis that is parallel to, but offset from the diagonal of the micromirror plate; and a hinge-support for holding the hinge, wherein the hinge support is curved at a natural resting state.

In yet another embodiment of the invention, a method for making a micromirror device is provided here. The method comprises: providing a substrate; depositing a first sacrificial layer; forming a micromirror plate on the first sacrificial layer for reflecting an incident light; depositing a second sacrificial layer on the micromirror plate; forming a hinge-structure on the second sacrificial layer for holding the micromirror plate such that the micromirror plate can pivot along an axis that is parallel to but offset from an diagonal of the micromirror plate, further comprising: depositing a first hinge-structure layer having an intrinsic positive tensile-strain; and depositing a second hinge-structure layer on the first layer, wherein the second layer has an intrinsic negative compression strain; removing the first and second sacrificial layers such that the first and second hinge-structure layers are curved at their natural resting states, and the micromirror plate held by the hinge-structure is not parallel to the substrate at its natural resting state.

In still yet another embodiment of the invention, a reflective micromirror device is disclosed herein. The device comprises: a substrate; a micromirror plate for reflecting an incident light; and a hinge-structure formed on the substrate for holding the micromirror plate, wherein the -hinge structure further comprises: a hinge attached to the micromirror plate such that the micromirror can pivot along an axis that is parallel to, but offset from a diagonal of the micromirror plate; and one or more mirror stops that stop a rotation of the micromirror plate along the axis.

In yet another embodiment of the invention, a micromirror array is disclosed herein. The device comprises: a substrate; and a plurality of micromirrors formed on the substrate, wherein each micromirror further comprises: a micromirror plate for reflecting an incident light; and a hinge-structure formed on the substrate for holding the micromirror plate, wherein the hinge-structure further comprises: a hinge attached to the micromirror plate such that the micromirror can pivot along an axis that is parallel to, but offset from a diagonal of the micromirror plate; and one or more mirror stops that stop a rotation of the micromirror plate along the axis.

In yet another embodiment of the invention, a projector is disclosed herein. The projector comprises: a light source for providing an incident light; and a micromirror array, further comprising: a substrate; and a plurality of micromirrors formed on the substrate, wherein each micromirror further comprises: a micromirror plate for reflecting an incident light; and a hinge-structure formed on the substrate for holding the micromirror plate, wherein the hinge-structure further comprises: a hinge attached to the micromirror plate such that the micromirror can pivot along an axis that is parallel to, but offset from a diagonal of the micromirror plate; and one or more mirror stops that stop a rotation of the micromirror plate along the axis.

In still yet another embodiment of the invention, a reflective micromirror device is disclosed herein. The device comprises: a substrate; a hinge held above the substrate by two or more posts formed on the substrate; and a micromirror plate attached to the hinge at a point not along a straight line between the two posts.

In yet another embodiment of the invention, a reflective micromirror device is disclosed herein. The device comprises: a substrate; a hinge-structure formed on the substrate, further comprising: two or more posts formed on the substrate; a hinge-support held by the two posts above the substrate, the hinge support being curved at a natural resting state; and a hinge held by the hinge-support above the substrate; and a micromirror plate attached to the hinge at a point that is not along a straight line between the two posts for reflecting an incident light, the micromirror plate having a defined diagonal.

In another embodiment of the invention, a reflective micromirror device is disclosed herein. The device comprises: a substrate; a micromirror plate for reflecting an incident light; and a hinge-structure formed on the substrate for holding the micromirror plate, wherein the hinge structure further comprises: two or more posts formed on the substrate; a hinge held by the posts above the substrate, the hinge being attached to the micromirror plate at a point that is not along a straight line between the two posts; and one or more mirror stops that stop a rotation of the micromirror plate along the axis.

In yet another embodiment of the invention, a micromirror array is disclosed herein. The micromirror array comprises: a substrate; and a plurality of micromirrors formed on the substrate, wherein each micromirror further comprises: a micromirror plate for reflecting an incident light; and a hinge-structure formed on the substrate for holding the micromirror plate, wherein the hinge-structure further comprises: two or more posts formed on the substrate; a hinge held by the posts above the substrate, the hinge being attached to the micromirror plate at a point not along a straight line between the two posts; and one or more mirror stops that stop a rotation of the micromirror plate along the axis.

In still yet another embodiment of the invention, a projector is disclosed herein. The projector comprises: a light source for providing an incident light; and a micromirror array, further comprising: a substrate; and a plurality of micromirrors formed on the substrate, wherein each micromirror further comprises: a micromirror plate for reflecting an incident light; and a hinge-structure formed on the substrate for holding the micromirror plate, wherein the hinge-structure further comprises: two or more posts formed on the substrate; a hinge held by the posts above the substrate, the hinge being attached to the micromirror plate at a point that is not along a straight line between the two posts; and one or more mirror stops that stop a rotation of the micromirror plate along the axis.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

FIG. 4C is a cross-sectional view of the micromirror device in an "ON" state;

FIG. 4D is a cross-sectional view of the micromirror device in yet another "OFF" state, wherein the hinge-structure has two sets of mirror stops;

FIG. 4E is a cross-sectional view of another embodiment of the micromirror device with the mirror in the "ON" state;

DETAILED DESCRIPTION OF THE EMBODIMENTS

Processes for micro-fabricating a MEMS device such as a movable micromirror and mirror array are disclosed in U.S. Pat. No. 5,835,256 and 6,046,840 both to Huibers, the subject matter of each being incorporated herein by reference. A similar process for forming MEMS movable elements (e.g. mirrors) on a wafer substrate (e.g. a light transmissive substrate or a substrate comprising CMOS or other circuitry) is illustrated in the present application. By "light transmissive", it is meant that the material will be transmissive to light at least in operation of the device (The material could temporarily have a light blocking layer on it to improve the ability to handle the substrate during manufacture, or a partial light blocking layer for decreasing light scatter during use. Regardless, a portion of the substrate, for visible light applications, is preferably transmissive to visible light during use so that light can pass into the device, be reflected by the mirrors, and pass back out of the device. Of course, not all embodiments will use a light transmissive substrate). By "wafer" it is meant any substrate on which multiple micromirrors or microstructure arrays are to be formed and which allows for being divided into dies, each die having one or more micromirrors thereon. Though not in every situation, often each die is one device or product to be packaged and sold separately. Forming multiple "products" or dies on a larger substrate or wafer allows for lower and faster manufacturing costs as compared to forming each die separately. Of course the wafers can be any size or shape, though it is preferred that the wafers be the conventional round or substantially round wafers (e.g. 4", 6" or 12" in diameter) so as to allow for manufacture in a standard foundry.

U.S. patent applications Ser. Nos. 09/910,537 filed Jul. 20, 2001 (now U.S. Pat. No. 7,057,246 issued Jun. 6, 2006), and 60/300,533 filed Jun. 22, 2001 both to Reid contain examples of materials that may be used for the various components of the current invention. These applications are incorporated herein by reference.

The present invention provides a spatial light modulator that has a higher resolution, an increased fill factor, and an increased contrast ratio in displaying an image. The spatial light modulator may be operated in the absence of polarized light. Moreover, the spatial light modulator has improved electromechanical performance and robustness with respect to manufacturing.

Figure 1:
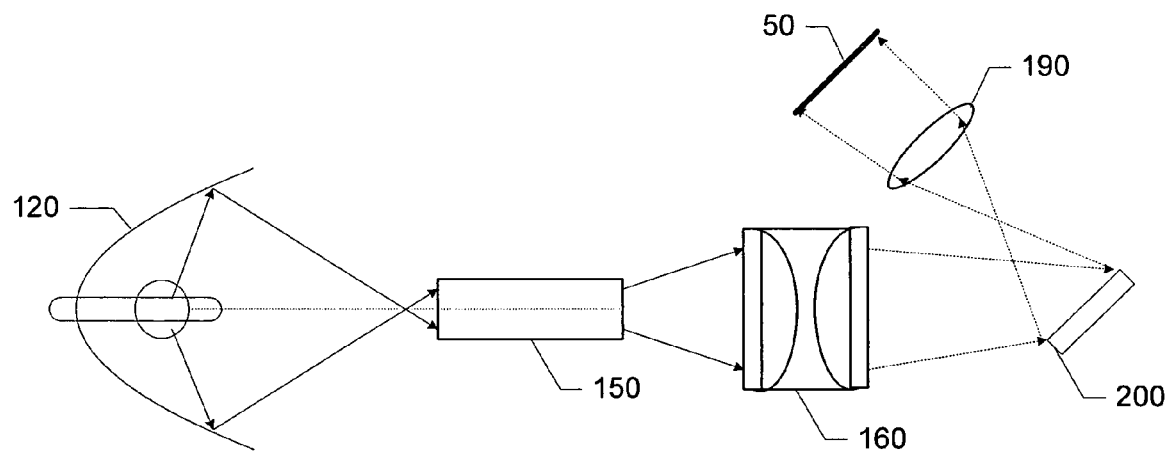
FIG. 1 diagrammatically illustrates an exemplary display system employing a spatial light modulator.

The spatial light modulator of the present invention has a variety of applications (e.g. maskless lithography, atomic spectroscopy, maskless fabrication of micromirror arrays, signal processing, microscopy etc), one of which is in display systems. A typical display system employing a spatial light modulator is illustrated in FIG. 1. In its very basic configuration, the display system comprises light source 120, optical devices (e.g. light pipe 150, collection optics 160 and projection optics 190), display target 50 and spatial light modulator 200. Light source 120 (e.g. an arc lamp) directs light through the light integrator/pipe 150 and collection optics 160 and onto spatial light modulator 200. The micromirrors of the spatial light modulator 200 are selectively actuated by a controller (e.g. as disclosed in U.S. Pat. No. 6,388,661 issued May 14, 2002 incorporated herein by reference) so as to reflect—when in their "ON" position—the incident light into projection optics 190, resulting in an image on display target 50 (screen, a viewer's eyes, a photosensitive material, etc.). Of course, more complex optical systems are often used—the display system of FIG. 1 being a simplification of a typical projection display optical system.

Figure 2:
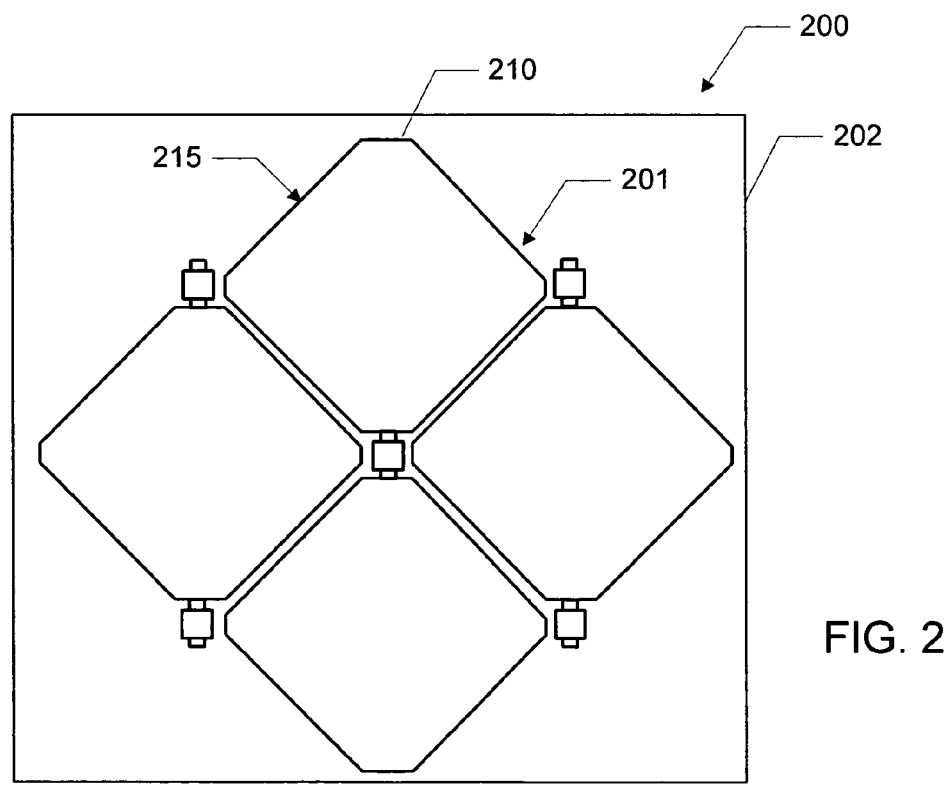
FIG. 2 is a top-view of the spatial light modulator used in the display system of FIG. 1.

The spatial light modulator, in general, comprises an array of thousands or millions of micromirrors. FIG. 2 illustrates a portion of an exemplary micromirror array. Referring to FIG. 2, a top-view of a portion of an exemplary spatial light modulator 200 looking through glass is illustrated therein. As shown, the spatial light modulator comprises micromirror array 201 that is formed on a substrate 202, such as glass that is visible light transmissive. Alternatively, substrate 202 is a typical semiconductor wafer that has formed thereon an array of electrodes and circuitry (not shown in FIG. 2) for electrostatically controlling motions of the micromirrors. Micromirror array 201 comprises a plurality of micromirror devices, such as micromirror device 215. And each micromirror device further comprises a reflective micromirror plate, such as micromirror plate 210 for reflecting the incident light. In operation, each individual micromirror can be deflected as desired under the control of one or more electrodes and circuitry, thereby the spatial modulation of the incident light traveling through substrate 202 (in this case, the substrate is a glass) and incident on the surfaces of the micromirrors can be achieved. To facilitate the micromirror plate rotating above the substrate (or below, depending upon the point of view) for reflecting the incident light, a hinge-structure is necessary to hold the micromirror plate above the substrate and provide a rotation axis for the micromirror plate.

Figure 3A:
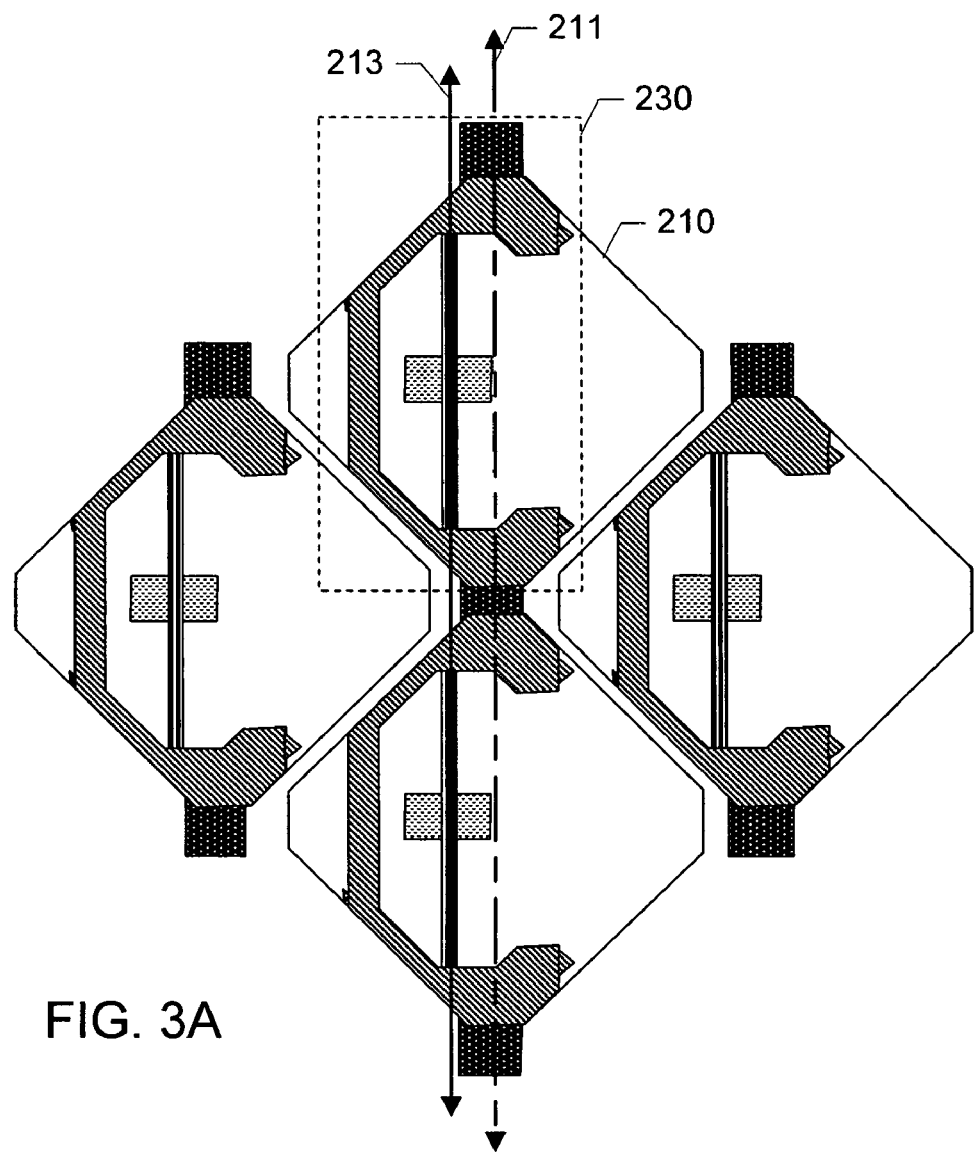
FIG. 3A is a back-view of a set of micromirrors according to an embodiment of the invention.

Referring to FIG. 3A, a back-view of the micromirror array (e.g. 201) shown in FIG. 2 is illustrated therein. Each micromirror plate (e.g. micromirror 210) is attached to a hinge-structure (e.g. hinge structure 230) such that the micromirror plate can pivot along the hinge structure above the substrate (e.g. substrate 202 in FIG. 2). In order to improve the quality of displayed images, the hinge structure is preferably formed under the micromirror plates as shown. Specifically, the hinge structure and the surface for reflecting the incident light are on the opposite sides of the micromirror plate.

According to an embodiment of the invention, the micromirror plate is attached to the hinge structure such that the micromirror plate can pivot along an axis that is parallel to but offset from a diagonal of the micromirror plate. For example, micromirror plate 210 has a well defined geometrical diagonal 211. However, the rotation axis of the micromirror plate is along direction 213 that is parallel to but offset from diagonal 211. Such a rotation axis can be achieved by attaching the hinge structure to the mirror plate at a point not along the mirror plate diagonal 211. The point of attachment can be at least 0.5 um, at least 1 um, or at least 2 um away from the diagonal 211. In one embodiment, the point of attachment is from 1/40 to 1/3 the length of the diagonal away from diagonal 211, or from 1/20 to 1/4 if desired—although any desired distance away from the diagonal is possible if so desired in the present invention. In the present invention, the micromirror preferably has a substantially four-sided shape. Whether the micromirror is a rectangle, square, rhombus or trapezoid, even if the corners are rounded or "clipped" or if an aperture or protrusion is located on one or more of the sides of the micromirror, it is still possible to conceptually connect the four major sides of the micromirror shape and take a diagonal across the middle of the micromirror. In this way, a center diagonal can be defined even if the micromirror plate is substantially but not perfectly a rhombus, trapezoid, rectangle, square, etc. However, the rotation axis of the micromirror plate is not along the center diagonal but is along direction 213 that is parallel to but offset from the diagonal 211 in FIG. 3A. By "parallel to but offset from the diagonal", it is meant that the axis of rotation can be exactly parallel to or substantially parallel to (±19 degrees) the diagonal of the micromirror. This type of design benefits the performance of the micromirror device in a number of ways. One advantage of this asymmetric offset arrangement is that the micromirror plate can rotate at a larger angle than the rotation angle that can be achieved in a symmetrical arrangement (with a mirror plate—substrate gap being the same). The length of the diagonal of the mirror plate is preferably 25 microns or less.

Figure 3B:
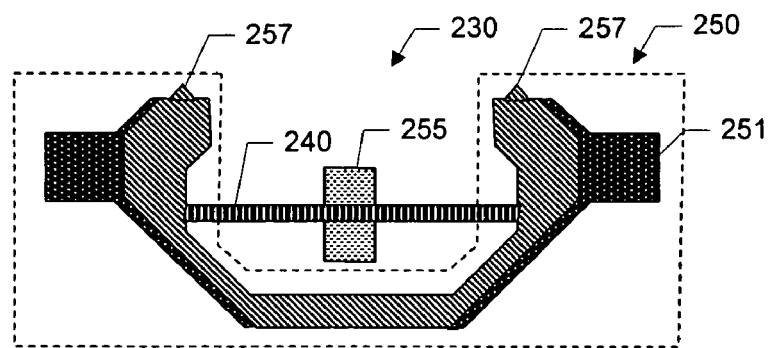
FIG. 3B illustrates a hinge-structure of the micromirrors of FIG. 3A.

In order to hold the micromirror plate and meanwhile, provide a rotation axis for the micromirror plate for rotating above the substrate, each hinge structure, such as hinge structure 230, further comprises hinge-support 250 and hinge 240, as shown in FIG. 3B. Hinge 240 is attached to the micromirror plate via contact 257. Hinge support 250 further comprises two posts 251. By "hinge" is meant the layer or stack of layers that defines that portion of the device that flexes to allow movement of the device (described in detail below). To improve the performance of the micromirror plate, further fine structures are also provided thereon. Specifically, two mirror stops 255 are formed on an edge of hinge support 250 for stopping the rotation of the micromirror plate when the micromirror plate achieves a certain angle. The geometrical arrangement, such as the length and the position of the mirror stop from the hinge-plate, along with the distance between the micromirror plate and the hinge determines the maximum rotation angle that the micromirror can achieve before contact. By properly setting the mirror stops for all micromirror plates in the micromirror array, a maximum rotation angle for all micromirrors can be uniformly defined. This uniformly defined rotation angle can then be defined as an "ON" state for all micromirrors in operation. In this case, all micromirrors in the spatial light modulator rotate to the uniformly defined angle in the "ON" state in an operation. The incident light can thus be uniformly reflected towards one desired direction for display. Obviously, this significantly improves the quality of the displayed image. Though preferred, the number of the mirror stops can be of any desired number (one or more) or need not be provided at all. And each mirror stop can be of any desired shape, though preferably one that minimizes the amount of contact between the mirror stop and the micromirror plate.

In the embodiment of the invention, the two posts are formed on the substrate. Hinge-support 250 is supported by the two posts above the substrate. The hinge (e.g. hinge 240) is affixed to the hinge-support and attached to the micromirror plate via the contact (e.g. contact 255). In this configuration, the micromirror plate can pivot along the hinge above the substrate.

Figure 3C:
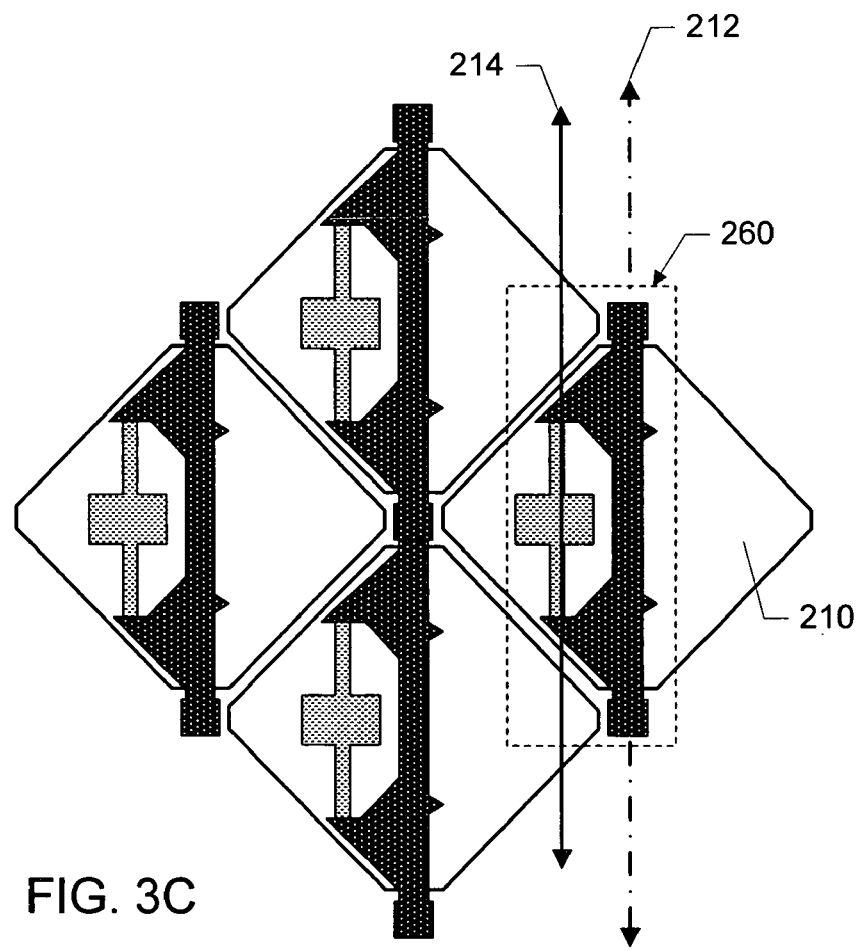
FIG. 3C is a back-view of a set of micromirrors according to another embodiment of the invention.

The hinge structure can take other suitable forms as desired. FIG. 3C illustrates another hinge structure design according to another embodiment of the invention. Similar to that of FIG. 3A, hinge structure 260 is formed on the substrate for supporting micromirror plate 210 and provides a rotation axis 214 for the micromirror plate. Rotation axis 214 is parallel to, but offset from a diagonal of micromirror plate 212. Similar to hinge-support 250 in FIG. 3B, hinge-support 263 in FIG. 3D also has a plurality of mirror stops formed thereon for stopping the rotation of the micromirror plate when the micromirror plate achieves a certain angle. The geometrical arrangement, such as the length and the position on the hinge-support, along with the distance between the micromirror plate and the hinge determines the maximum rotation angle that the micromirror can achieve before contact. Though preferred, the number of the mirror stops can be of any desired number. And each mirror stop can be of any desired shape.

Figure 3D:
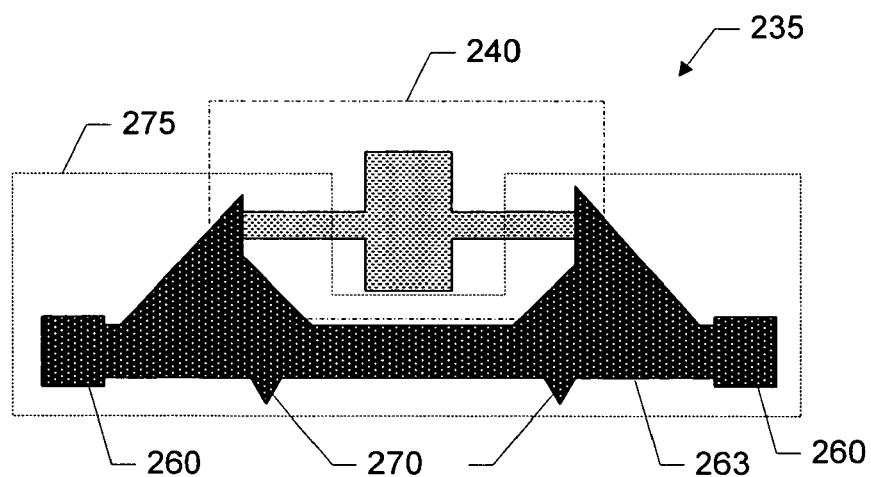
FIG. 3D shows a hinge-structure of the micromirrors of FIG. 3C.
Figure 3E:
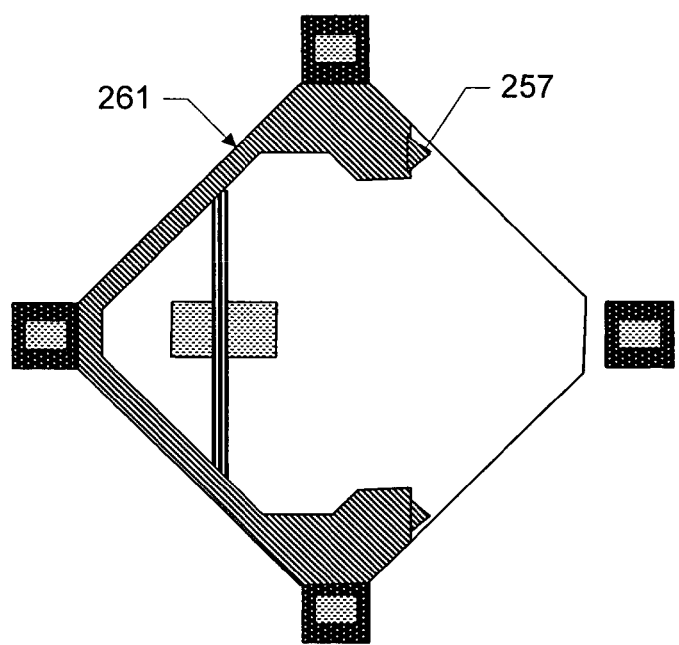
FIG. 3E illustrates therein a hinge-structure according to yet another embodiment of the invention.

The hinge structure can also take other suitable forms. For example, hinge support 261 can be formed along the edges of one part of the micromirror plate such that the hinge-support passes through a post of adjacent micromirror device, as shown in FIG. 3E In this case, the hinge-support of all micromirror devices form a continuous hinge-support frame for all micromirror plates. This allows 2-dimensional electrical connection of the micromirrors in the array.

Figure 3F:
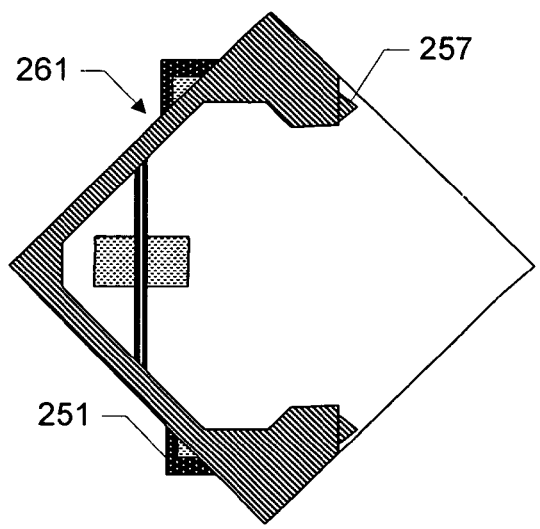
FIG. 3F illustrates therein a hinge-structure according to yet another embodiment of the invention.
Figure 3G:
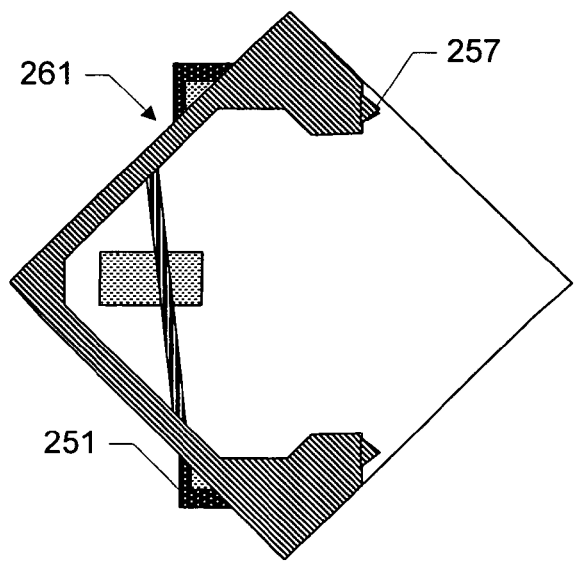
FIG. 3G illustrates therein a hinge-structure according to another embodiment of the invention.

Alternatively, the posts of each hinge structure are not required to be formed along the diagonal of the micromirror plate. Referring to FIG. 3F, two posts 251 of the hinge structure are formed along the edges of the micromirror plate instead of at the corners of the micromirror plate. In addition, the hinge is not required to be placed such that the hinge and the two arms intersected with the hinge form an isosceles triangle, as shown in the figure. Instead, as shown in FIG. 3G, the hinge may be placed such that it is substantially parallel but forms a small angle (±19 degrees) with the hinge position in FIG. 3F.

In operation, the micromirror plate rotates along the hinge that is parallel to but offset from a diagonal of the micromirror plate. Based on rotation angles, "ON" and "OFF" states are defined. At the "ON" state, the micromirror plate is rotated to a predefined angle such that the incident light can be reflected into a direction for view, for example, into a set of prearranged optic devices for directing light towards a target. In the "OFF" state, the micromirror plate stays flat or at another angle such that the incident light will be reflected away from the display target. FIG. 4A through FIG. 4D illustrate cross-sectional views of a micromirror device in operation.

Figure 4A:
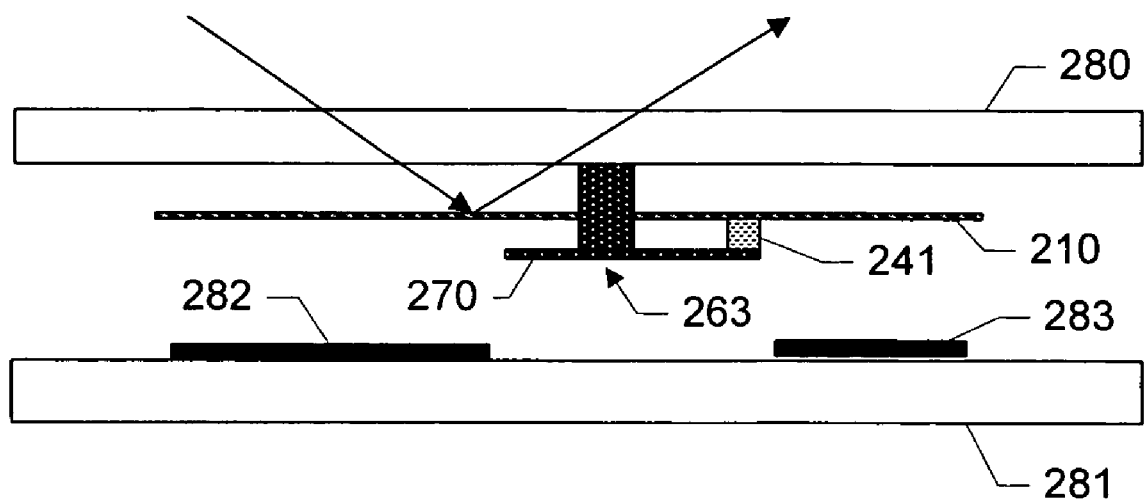
FIG. 4A is a cross-sectional view of the micromirror device in an "OFF" state.
Figure 4B:
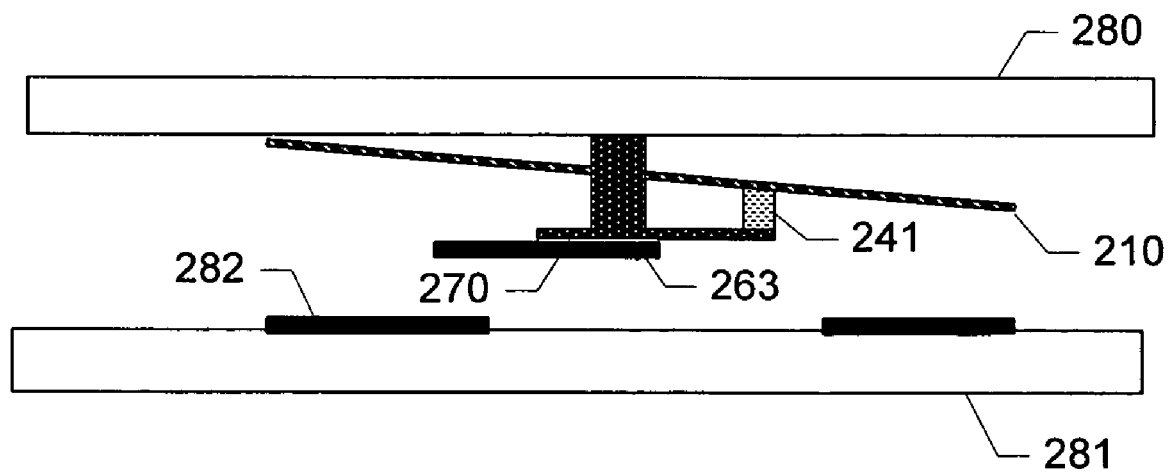
FIG. 4B is a cross-sectional view of the micromirror device in another "OFF" state.

Referring to FIG. 4A, an "OFF" state is define as micromirror plate 210 at its natural resting state that is parallel to glass substrate 280. Hinge support 263 is formed on the substrate for supporting the micromirror plate. The hinge (e.g. hinge 240 in FIG. 3B) is affixed to hinge-support 263 and attached to micromirror plate 210 via shallow via contact 241 (hereafter "contact") for providing a rotational axis for the micromirror plate. In this "OFF" state, the incident light travels through the glass substrate, shines on one surface of the micromirror plate at a particular incident angle and is reflected away from the target by the micromirror plate. The rotation of the micromirror plate can be electrostatically controlled by electrode 282 and a circuitry (not shown) that is connected to the electrode. In an embodiment of the invention, the electrode and circuitry are formed in wafer 281, which can be a typical silicon wafer. In order to efficiently control the rotation of the micromirror plate, wafer 281 is placed approximate to the micromirror plate such that electrostatic fields can be established between micromirrors and associated electrodes. Alternatively, more than one electrode can be used for controlling the rotation of the micromirror plate. Specifically, electrode 283 (and circuitry connected to the electrode, which is not shown) can be formed and placed underneath the other portion of the micromirror plate for controlling the micromirror plate in an "OFF" state, as shown in FIG. 4B. In another embodiment of the invention, the electrodes, the circuitry and the micromirrors can be formed on the same substrate, such as substrate 280. In this case, substrate 280 can be a standard silicon wafer. And the incident light shines the opposite surface of the micromirror plate. To improve the quality of the displayed image, especially the contrast ratio, it is desired that the reflected light in the "OFF" state be reflected as much as possible away from the collection optics or target. To achieve this, another "OFF" state is defined as shown in FIG. 4B. Referring to FIG. 4B, micromirror plate 210 is rotated at an angle in the "OFF" state. As an optional feature, the angle corresponding to this "OFF" state is defined such that one end of the micromirror plate touches and is stopped by the substrate when the micromirror plate is rotated to this angle. This definition ensures a uniform "OFF" state for all micromirror plates in the micromirror array. Of course, other methods can also be employed in defining an "OFF" state angle. For example, by properly controlling the electric field applied between the micromirror plate and the electrode(s) and circuitry associated with the micromirror plate, desired angles "corresponding to the "OFF" state can be achieved. In order to direct the reflected light into the target for displaying, the micromirror plate needs to be rotated to a certain angle, which is corresponds to an "ON" state. FIG. 4C illustrates a cross-sectional view of the micromirror device in an exemplary "ON" state according to an embodiment of the invention. In this "ON" state, the rotation of the micromirror plate is stopped by mirror stops 270. By adjusting the configuration (e.g. length and the position on the hinge structure) of the mirror stops, the angle corresponding to the "ON" state can thus be adjusted, as long as the other end of the micromirror plate is free to move. The presence of the mirror stops benefit a uniform "ON" state for all micromirror plates in the spatial light modulator, thus, the quality of the displayed image is significantly improved. As an optional feature of the embodiment, the mirror stops can be designed and formed such that the other end of the micromirror plate touches and is stopped by the substrate when the rotation of the micromirror plate touches and is stopped by the mirror stops, as shown in FIG. 4C. This dual-stopping mechanism further guarantees a uniform rotation angle corresponding to the "On" state for all micromirror plates. As a further optional feature, another set of mirror stops for the "OFF" state may also be provided in addition to the set of mirror stops for the "ON" state, as shown in FIG. 4D.

Referring to FIG. 4D, a first set of mirror stops 270 is formed on the hinge structure for providing a uniform "ON" state for all micromirror plates. And a second set of mirror stops 275 is further provided for ensuring a uniform "OFF" state for all micromirror plates. The physical properties (e.g. length and position) of the second set of mirror stops 275 determine the rotation position of the "OFF" state. Alternatively, the second set of mirror stops can be designed and formed such that the other end of the micromirror plate touches and is stopped by the glass substrate when the micromirror plate touches and is stopped by the second set of mirror stops.

In operation, the micromirror plate (e.g. 210 in FIG. 3C) pivots along the hinge and reflects incident light. This type of operation mechanism calls for certain requirements on the optical, mechanical and electric properties of the micromirror plate, hinge structure and contact 255. In particular, the micromirror plate is desired to comprise a material having high reflectivity to the light of interest, for example, a material of early transition metal, metal or metal alloy. In addition, it is desired that the material of the micromirror plate also exhibits suitable mechanical properties (e.g. low creep rate and high elastic modulus etc.) for enhancing the mechanical property of the micromirror plate. Furthermore, it is desired that the material of the micromirror plate is electrically conductive such that an electric voltage can be applied thereto.

The hinge-support (e.g. 260 in FIG. 3C) provides an axis by which the micromirror plate (e.g. micromirror plate 210) can rotate. Because the hinge-support may scatter incident light and the scattered light can be mingled with the reflected light, thereby, the contrast ration can be degraded. In order to suppress this type of scattering, the hinge structure is preferably "hidden" beneath the micromirror plate. For example, the hinge structure is formed on a side of the micromirror plate that is opposite to the side of the micromirror plate reflecting the incident light. In accordance with the operation mechanism of the micromirror plate and the constructional design, it is desired that the posts comprise materials that are insusceptible to elastic deformation (e.g. fatigue, creep, dislocation motion) during the operation of the device. It is also preferred that such materials have large elastic modulus and exhibits high stiffness. Opposite to that of the posts, the materials of the hinge (e.g. hinge 240 in FIG. 3D) are expected to be more compliant because the hinge deforms while the micromirror plate pivots. Moreover, the hinge is desired to be electrically conducting such that the micromirror plate can be held at a particular voltage level.

In order to achieve the defined "OFF" states in FIG. 4B and FIG. 4D, external forces (e.g. electrical fields) may required to rotate the micromirror plate. For example, an electrode 283 and circuitry may be disposed underneath the portion of the micromirror plate being rotated away from the substrate. An electric field can then be applied between the electrode and the portion of the micromirror plate for rotating the micromirror plate to the "OFF" state. This design, however, requires extra electrodes and circuitry.

Figure 5A:
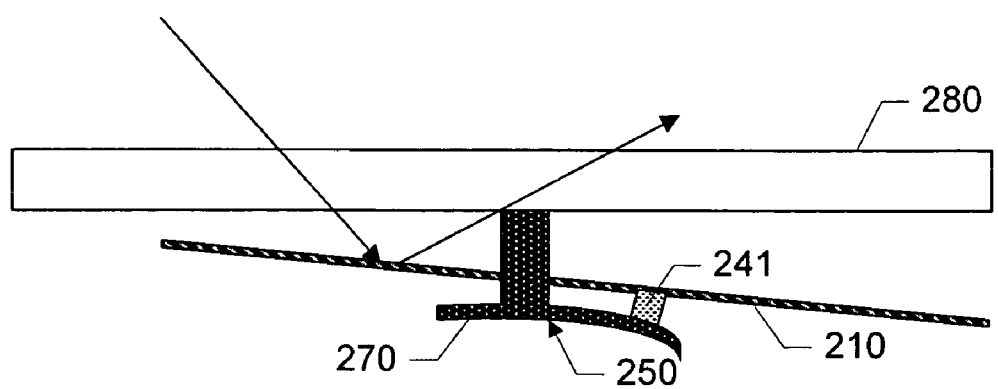
FIG. 5A is a cross-sectional view of a micromirror device having a hinge-support that curves at a natural resting state.

According to an aspect of the invention, a hinge-support with a portion that is curved away from the substrate at the natural resting state is proposed, as shown in FIG. 5A. Referring to FIG. 5A, hinge-support portion 250 is curved away from the substrate at its natural resting state. And micromirror plate 210, which is attached to the curved hinge-support, presents a finite angle with the substrate without external force (e.g. external electrical field). By adjusting the curvature of the hinge-support portion, a desired angle between the micromirror plate and the substrate can be achieved.

Figure 5B:
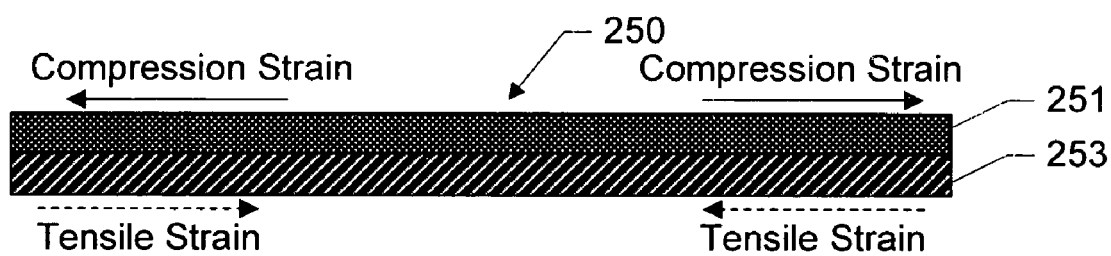
FIG. 5B is a cross-sectional view of an exemplary hinge-support before releasing according to an embodiment of the invention.

The curved hinge-support can be formed in many different ways. An exemplary method will be discussed in the following with references to FIG. 5b and FIG. 5C. Referring to FIG. 5B, hinge-support 250 composes two layers, layer 251 and layer 253. Layer 251 exhibits an outwards compression strain at its deposition state (e.g. when layer 251 is deposited on a sacrificial layer). In the preferred embodiment of the invention, layer 251 is $TiN_x$ with a preferred thickness of 80 Å. Though preferred, layer 251 can be of any suitable material as long as it exhibits an outwards compression strain. The thickness of layer 251 can also be of any suitable range, such as a thickness between 10 Å to 1500 Å. Layer 253 is deposited on layer 251 and exhibits an inwards tensile strain at its deposition state. In a preferred embodiment of the invention, layer 253 is $SiN_x$ with a preferred thickness of 400 Å. Though preferred, layer 253 can be of any suitable material as long as it exhibits an inwards tensile strain. The thickness of layer 253 can also be of any suitable range, such as a thickness between 10 Å to 2000 Å. PVD (physical vapor deposition or sputtering) tends to produce compressive films, especially for high melting temperature metals, whereas CVD (chemical vapor deposition) tends to produce tensile films. Therefore, in one embodiment layer 251 is a layer deposited by PVD and layer 253 is deposited by CVD. In one specific example, layer 251 is a reactively sputtered ceramic layer and layer 253 is a ceramic layer deposited by chemical vapor deposition.

Figure 5C:
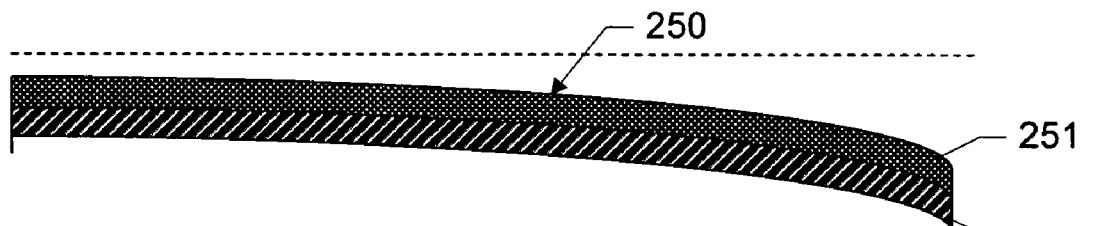
FIG. 5C is a cross-sectional view of the hinge-support of FIG. 5B after releasing.

After releasing, (for example, by removing the sacrificial layer, on which layer 251 is deposited), layers 253 and 251 curve towards layer 253, which exhibits inwards tensile strain. This curving of the two layers is a spontaneous phenomenon and happens in the presence of material stresses. The curvature is determined upon the relative strengths of the inwards tensile strain and outwards compression strain. Referring to FIG. 5C, a schematic diagram showing the curved two layers is presented therein. However, depending upon the location of the hinge connection to the mirror plate, the order of the layers can be reversed in order to cause curvature of the hinge structure in the opposite direction while rotating the mirror plate in the same direction for the "OFF" state.

There is a variety of ways to construct the micromirror device described above. Exemplary processes will be discussed in the following with references to FIG. 6A through FIG. 6H. It should be appreciated by those ordinary skills in the art that the exemplary processes are for demonstration purpose only and should not be interpreted as limitations.

Figure 6A:
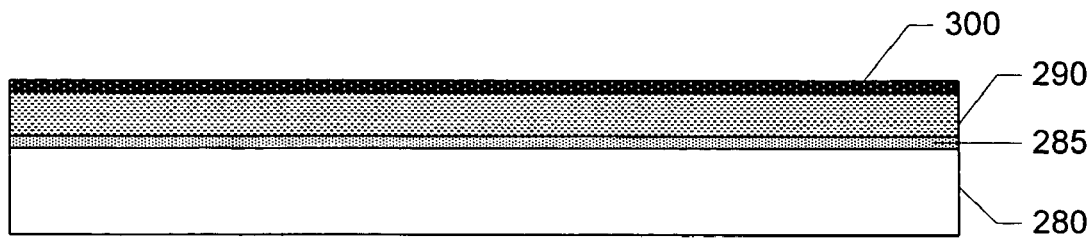
FIG. 6A to FIG. 6H are cross-sectional views of structures illustrating a method for forming a micromirror device according an embodiment of the invention.

Referring to FIG. 6A, substrate 280 is provided. First sacrificial layer 290 is deposited on the substrate followed by the deposition of micromirror plate layer 300. The substrate can be a glass (e.g. 1737F, Eagle 2000), quartz, Pyrex™, sapphire. The substrate may also be a semiconductor substrate (e.g. silicon substrate) with one or more actuation electrodes and/or control circuitry (e.g. CMOS type DRAM) formed thereon.

First sacrificial layer 290 is deposited on substrate 280. First sacrificial layer 290 may be any suitable material, such as amorphous silicon, or could alternatively be a polymer or polyimide, or even polysilicon, silicon nitride, silicon dioxide, etc. depending upon the choice of sacrificial materials, and the etchant selected. If the first sacrificial layer is amorphous silicon, it can be deposited at 300-350° C. The thickness of the first sacrificial layer can be wide ranging depending upon the micromirror size and desired title angle of the micro-micromirror, though a thickness of from 500 Å to 50,000 Å, preferably around 10,000 Å, is preferred. The first sacrificial layer may be deposited on the substrate using any suitable method, such as LPCVD or PECVD.

As an optional feature of the embodiment, anti-reflection layer 285 maybe deposited on the surface of the substrate. The anti-reflection layer is deposited for reducing the reflection of the incident light from the surface of the substrate. Alternatively, other optical enhancing layers may be deposited on either surface of the glass substrate as desired.

Figure 6B:
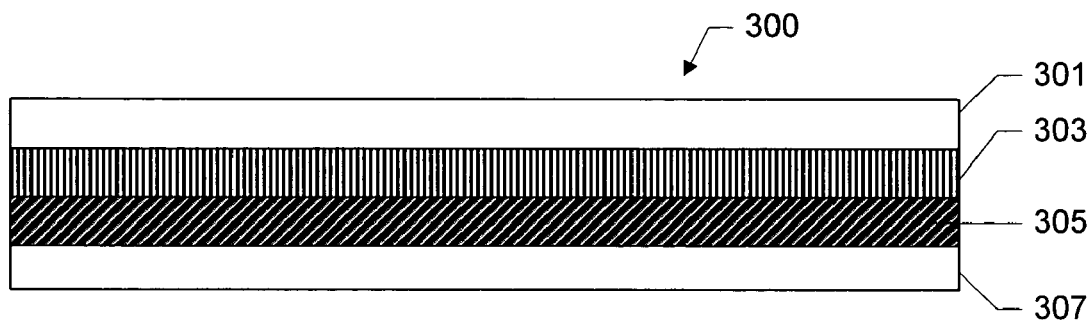

After depositing the first sacrificial layer, a plurality of structure layers will be deposited and patterned as appropriate. According to the invention, a structural layer is a layer that will not be removed after the removal of the sacrificial layers. The first structural layer deposited on the first sacrificial layer is micromirror plate layer 300 for forming a micromirror. Because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light. According to the embodiment of the invention, micromirror plate layer 300 is a multi-layered structure as shown in FIG. 6B. Referring to FIG. 6B, hinge plate layer 300 comprises layers 307, 305, 303 and 301. Layers 307 and 301 are protection layers for protecting the interior layers (e.g. layers 303 and 305). In the preferred embodiment of the invention, layers 307 and 301 are $SiO_x$ with a preferred thickness of 400 Å. Of course, other suitable materials may also be employed herein. Layer 305 is a light reflecting layer that comprises one or more materials exhibiting high light reflectivity. Examples of such materials are Al, Ti, AlSiCu or TiAl. In the preferred embodiment of the invention, layer 305 is aluminum with a thickness of 2500 Å. This aluminum layer is preferred to be deposited at 150° C. or other temperatures preferably less than 400° C. Layer 303 is an enhancing layer that comprises of metal or metal alloy for enhancing the electric and mechanical properties of the micromirror plate. An example of such enhancing layer is titanium with a thickness of 80 Å. Of course, other suitable materials having high reflectivity to the incident light of interest may also be adopted for the micromirror plate. In depositing the micromirror plate layer, PVD is preferably used at 150° C. The thickness of the micromirror plate layer can be wide ranging depending upon the desired mechanical (e.g. elastic module), the size of the micromirror, desired titled angle and electronic (e.g. conductivity) properties of the micromirror plate and the properties of the materials selected for forming the micromirror plate. According to the invention, a thickness of from 500 Å to 50,000 Å, preferably around 2500 Å, is preferred.

According to another embodiment of the invention, the light reflecting layer 305 is an electro-conducting layer that comprises a material having a resistivity less than 10,000 μΩ·cm. Layers 301 and 307 are insulators with resistivities greater than 10,000 μΩ·cm. And layer 303 is an electro-conducting layer with a resistivity also less than 10,000 μΩ·cm.

Though preferred, the multilayered structure as shown in FIG. 6B comprises four layers. It will be appreciated by those ordinary skills in the art that the number of the multilayered structure should not be interpreted as a limitation. Instead, any number of layers (including a single layer) can be employed without departing from the spirit of the present invention.

Figure 6C:
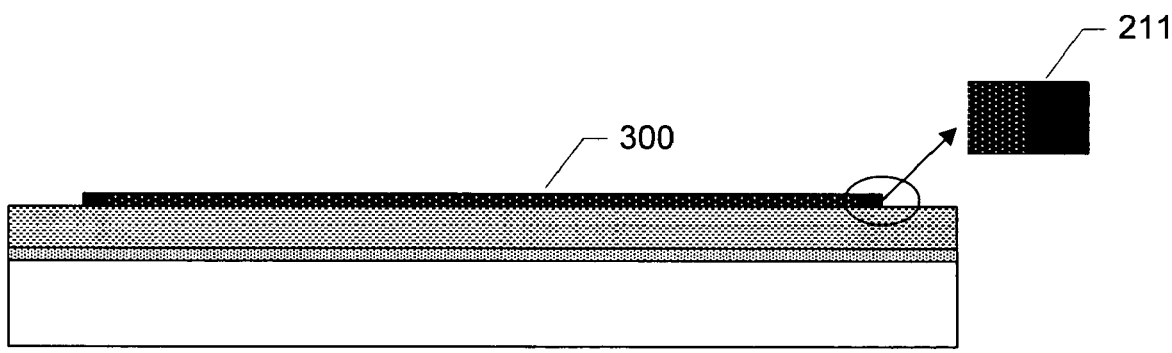

Micromirror plate layer 300 is then patterned into a desired shape, as shown in FIG. 6C. The micromirror can be of any shape as desired. The patterning of the micromirror can be achieved using standard photoresist patterning followed by etching using, for example CF4, Cl2, or other suitable etchant depending upon the specific material of the micromirror plate layer.

Figure 6D:
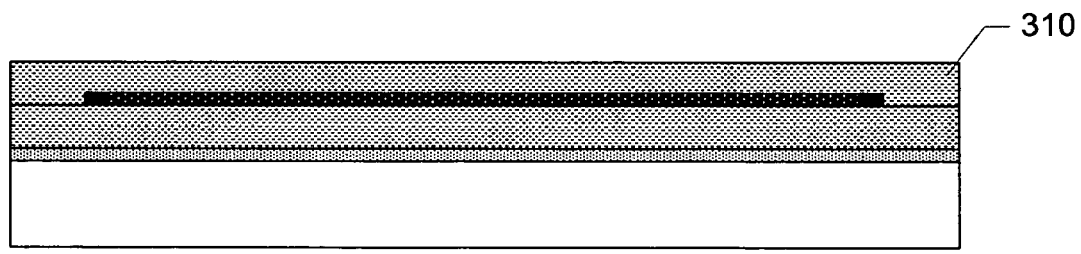

After the formation of the micromirror plate, further structural layers are deposited and patterned. Specifically, a plurality of layers of the hinge structure will be deposited and patterned for forming the hinge structure. Referring to FIG. 6D, before depositing further structural layers, second sacrificial layer 310 is deposited on top of the micromirror plate 300 and first sacrificial layer 290. Second sacrificial layer 310 may comprise amorphous silicon, or could alternatively comprise one or more of the various materials mentioned above in reference to first sacrificial layer 290. First and second sacrificial layers need not be the same, though are the same in the preferred embodiment so that, in the future, the etching process for removing these sacrificial layers can be simplified. Similar to the first sacrificial layer, second sacrificial layer 310 may be deposited using any suitable method, such as LPCVD or PECVD. If the second sacrificial layer comprises amorphous silicon, the layer can be deposited at 350° C. The thickness of the second sacrificial layer can be on the order of 9000 Å, but may be adjusted to any reasonable thickness, such as between 2000 Å and 20,000 Å depending upon the desired distance (in the direction perpendicular to the micromirror plate and the substrate) between the micromirror plate and the hinge. It is preferred that the hinge and mirror plate be separated by a gap after release of at least 0.5 um (this can be at least 1 um or even 2 um or more if desired). Second sacrificial layer 310 may also fill in the trenches left from the patterning of the micromirror plate.

In the preferred embodiment of the invention, the micromirror plate layer comprises an aluminum layer (e.g. layer 305 in FIG. 6B), and the second sacrificial layer is silicon. This design, however, can cause defects in the hinge-structure due to the diffusion of the aluminum and silicon at the edges of the micromirror plate, wherein the aluminum is exposed to the silicon. To solve this problem, a protection layer (not shown) maybe deposited on the patterned micromirror plate before depositing the second sacrificial silicon layer such that the aluminum layer can be isolated from the silicon sacrificial layer. Then the protection layer is patterned according to the shape of the micromirror plate. After the patterning, segments of the protection layer (e.g. segment 211 in FIG. 6C) cover the edges of the micromirror plate for isolating the aluminum and the silicon sacrificial layer.

Figure 6E:
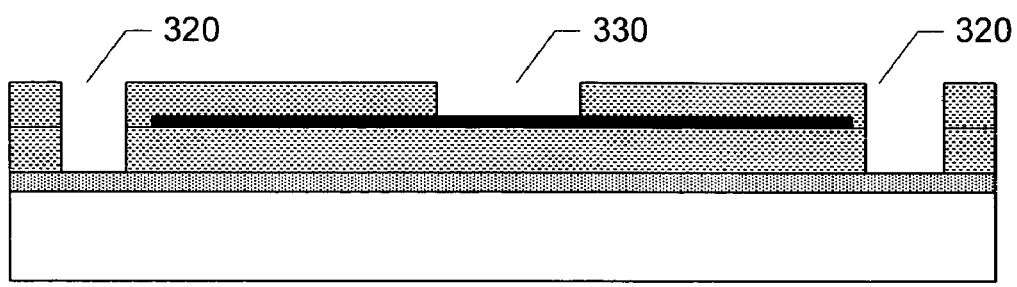

The deposited second sacrificial layer is patterned afterwards for forming two deep-via areas 320 and shallow via area 330 using standard lithography technique followed by etching, as shown in FIG. 6E. The etching step may be performed using $Cl_2$, $BCl_3$, or other suitable etchant depending upon the specific material(s) of the second sacrificial layer. The distance across the two deep-via areas 320 depends upon the length of the defined diagonal of the micromirror plate. In an embodiment of the invention, the distance across the two deep-via areas after the patterning is preferably around 10 μm, but can be any suitable distance as desired. In order to form shallow-via area 330, an etching step using $CF_4$ or other suitable etchant may be executed. The shallow-via area, which can be of any suitable size, is preferably on the order of 2.2 μm on a side.

Figure 6F:
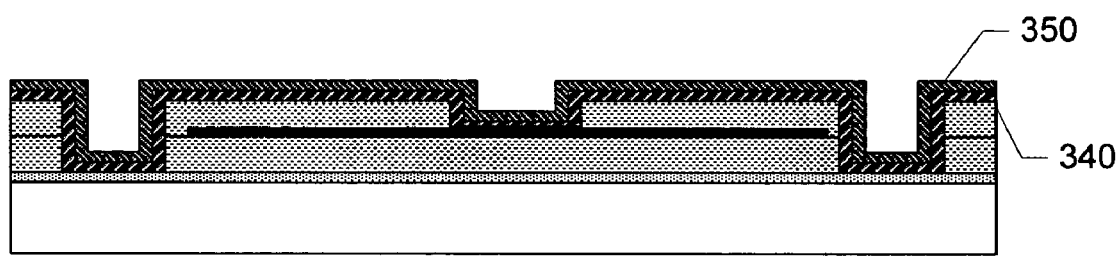

Referring to FIG. 6F, hinge-support layers 340 and 350 are deposited on the patterned second sacrificial layer 310. Because the hinge-support layers (layers 340 and 350) are designated for holding the hinge (e.g. 240 in FIG. 3D) and the micromirror plate (e.g. 210 in FIG. 3C) attached therewith such that the micromirror plate can pivot along the hinge, it is desired that the hinge support layers comprise of materials having at least large elastic modulus. According to an embodiment of the invention, layer 340 comprises a 400 Å thickness of $TiN_x$ (although it may comprise $TiN_x$, and may have a thickness between 100 Å and 2000 Å) layer deposited by PVD, and a 3500 Å thickness of $SiN_x$ (although the thickness of the $SiN_x$ layer may be between 2000 Å and 10,000 Å) layer 350 deposited by PECVD. Of course, other suitable materials and methods of deposition may be used (e.g. methods, such as LPCVD or sputtering). The $TiN_x$ layer is not necessary for the invention, but provides a conductive contact surface between the micromirror and the hinge in order to, at least, reduce charge-induced stiction. According to the embodiment of the invention, layers 340 and 350 are deposited such that an inwards compression strain and outwards tensile strain are inherently presented for forming a curved hinge-support (e.g. 250 in FIG. 5A), as shown in FIG. 5C. Alternatively, the $TiN_x$ and $SiN_x$ layers can also be deposited such that the intrinsic stress is as low as possible, preferably lower than 250 MPa for forming a flat hinge-support. In either case, the $SiN_x$ layer can be deposited at 400° C.

Figure 6G:
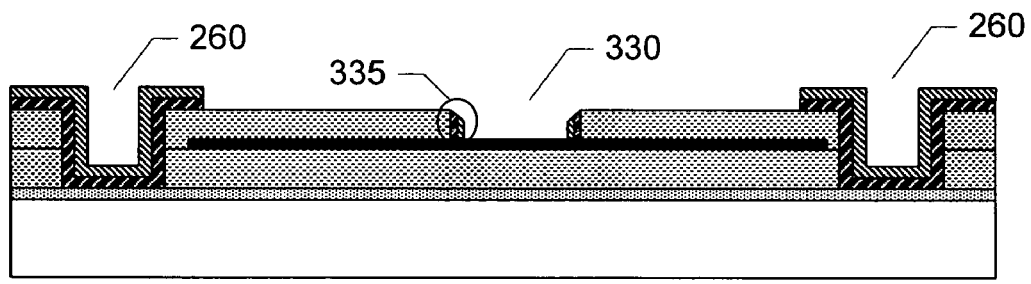

After the deposition, layers 340 and 350 are patterned into a desired configuration (e.g. hinge support 275 in FIG. 3D), as shown in FIG. 6G. Posts 260 can take any desired forms, one of which is shown in FIG. 3D. Alternatively, each of the two posts may be formed as a diamond, such as posts 251 in FIG. 3F. The mirror stops, such as the mirror stops (e.g. mirror stops 270 in FIG. 3D) corresponding to the "ON" state and/or mirror stops (not shown) corresponding to the "OFF" state can also be configured. An etching step using one or more proper etchants is then performed afterwards. In particular, the layers can be etched with a chlorine chemistry or a fluorine chemistry where the etchant is a perfluorocarbon or hydrofluorocarbon (or $SF_6$) that is energized so as to selectively etch the hinge support layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge support layer (e.g. chlorine chemistry for a metal layer, hydrocarbon or fluorocarbon (or $SF_6$) plasma for silicon or silicon compound layers, etc.). Alternatively, the etching step can be performed after deposition of each hinge support layer. For example, layer 340 can be etched and patterned after the deposition of layer 340 and before the deposition of layer 350.

After etching layers 340 and 350, two posts 260 and a contact area 330 are formed. The bottom segment of contact area 330 is removed by etching and the part of the micromirror plate underneath the contact area is thus exposed. The exposed part of micromirror 210 will be used to form an electric-contact with external electric source. The sidewalls (e.g. 335) of contact area 330 are left with residues of layers 340 and 350 after etching. The residue 335 has a slope measured by angle θ approximately 75 degrees, but may vary between 0 and 89 degrees. The residue on the sidewalls helps to enhance the mechanical and electrical properties of the hinge that will be formed afterwards. Each of the two posts 260 on either side of the mirror can form a continuous element with the posts corresponding to the adjacent micromirror in an array as shown in FIG. 2.

Figure 6H:
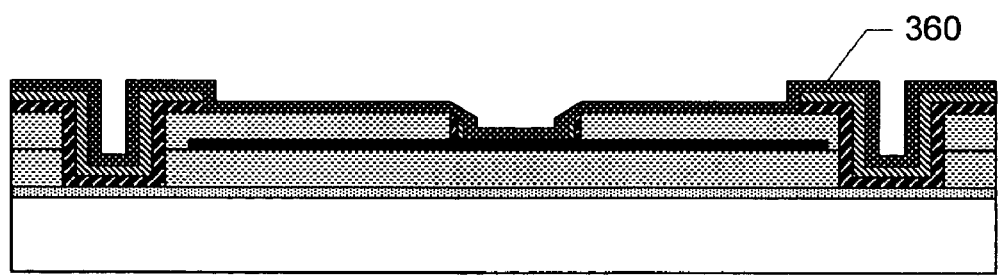

After the completion of patterning and etching of layers 340 and 350, hinge layer 360 is deposited and then patterned as shown in FIG. 6H. Because the hinge provides a rotation axis for the micromirror plate, it is natural to expect that the hinge layer comprises a material that is at least susceptible to plastic deformation (e.g. fatigue, creep, and dislocation motion). Furthermore, when the hinge layer is also used as electric contact for the micromirror plate, it is desired that the material of the hinge layer is electrically conductive. Examples of suitable materials for the hinge layer are silicon nitride, silicon oxide, silicon carbide, polysilicon, Al, Ir, titanium, titanium nitride, titanium oxide(s), titanium carbide, $CoSiN_x$, $TiSiN_x$, $TaSiN_x$, or other ternary and higher compounds. When titanium is selected for the hinge layer, it can be deposited at 100° C. Alternatively, the hinge layer may comprise of multi-layers, such as 100 Å $TiN_x$ and 400 Å $SiN_x$.

After deposition, the hinge layer is then patterned as desired using etching. Similar to the hinge layers (layers 340 and 350), the hinge layer can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.).

Figure 8:
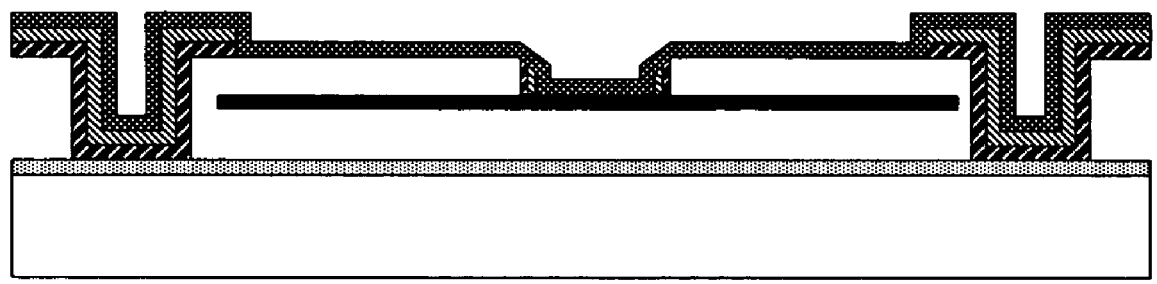
FIG. 8 presents a cross-sectional view of a micromirror device after releasing by removing the sacrificial layers.

In order to release the micromirror plate for pivoting along the hinge, the sacrificial layers (e.g. layers 290 and 310) are removed by etching as discussed below. A cross-sectional view of the released micromirror device is presented in FIG. 8.

In the above described exemplary fabrication process, the processes for forming the hinge support (e.g. processes described in FIG. 6A to FIG. 6G) and the process for forming the hinge (e.g. process described in FIG. 6H) are performed consecutively. In particular, the patterning and etching of the hinge support is followed by the deposition, patterning and etching of the hinge. The hinge and the hinge support can be formed simultaneously according to another embodiment of the invention, which will be described in the following with references to FIG. 7A and FIG. 7B.

Figure 7A:
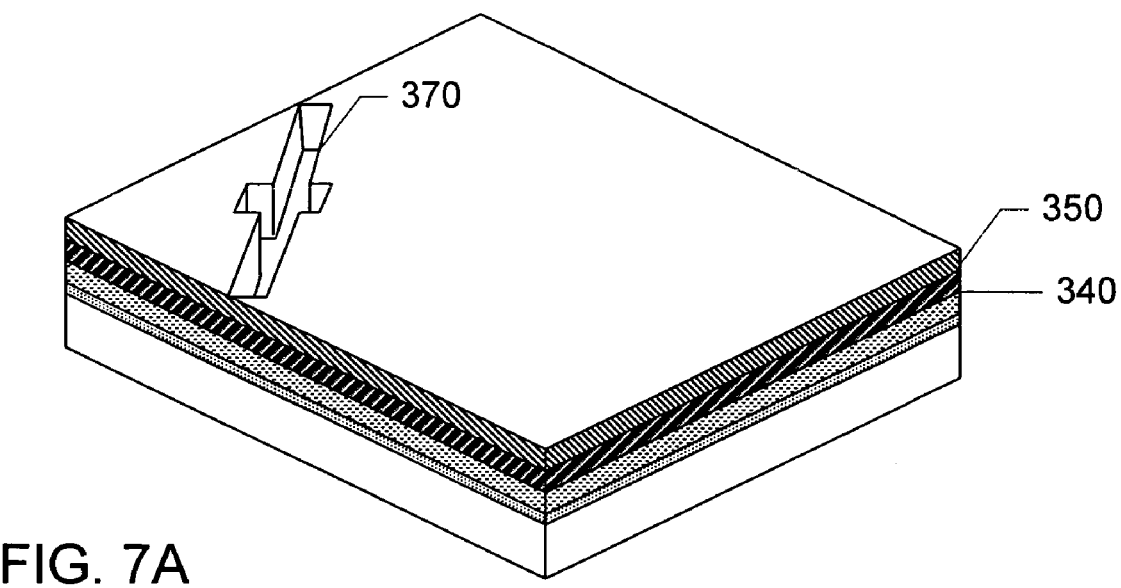
FIG. 7A to FIG. 7B are cross-sectional views of structures illustrating another method for forming a micromirror device according to another embodiment of the invention.
Figure 7B:
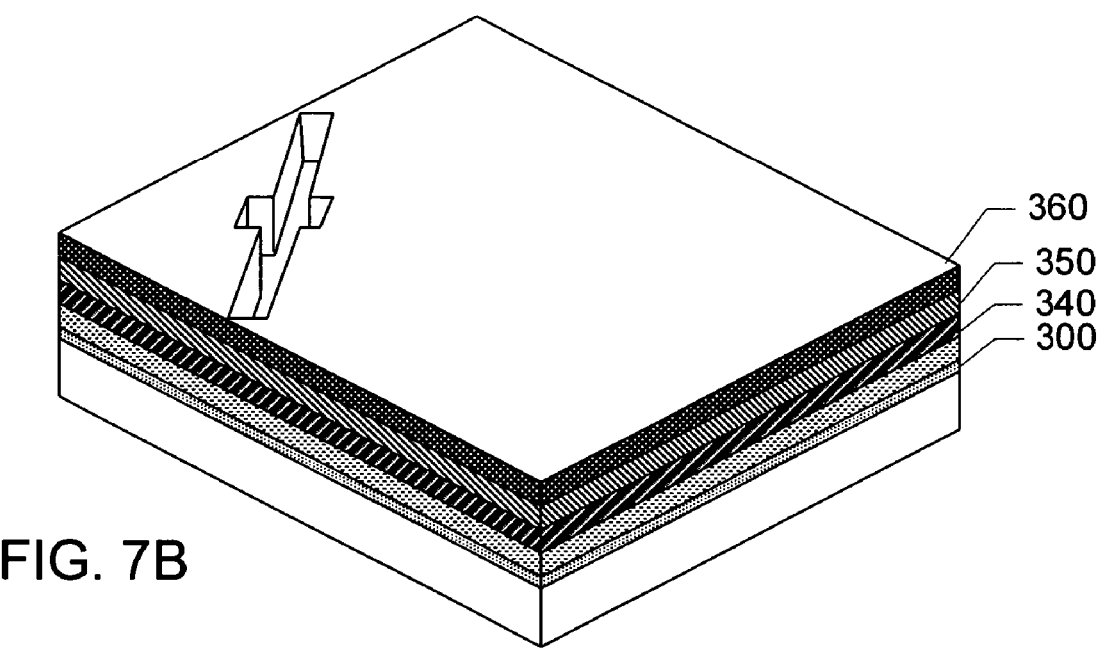

Referring to FIG. 7A, the deposited hinge layers 340 and 350 for the hinge support (e.g. 275 in FIG. 3D) are first patterned and etched according to the desired configuration of the hinge. After etching, window 370 corresponding to the future location of the hinge (e.g. hinge 240 in FIG. 3D) is thus formed thereby. Window 370 is disposed parallel to but offset from a diagonal of the micromirror plate. The window is etched down to the top surface of the second sacrificial layer (e.g. 310 in FIG. 6D) and/or micromirror plate such that the bottom of the window exposes a part of the micromirror plate.

Following the completion of the patterning, hinge layer 360 is deposited on the patterned hinge support layer (e.g. 350) and fills window 370. After deposition, layer 340, 350 and 360 are then patterned and etched simultaneously. In a preferred embodiment of the invention, layers 340 and 350 are patterned and etched simultaneously using the same method that is described in FIG. 6G. After patterning and etching of layers 340 and 350, the sacrificial layers are removed by etching for releasing the micromirror device.

The release etching utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel at al. filed Aug. 28, 2000, the subject matter of each being incorporated herein by reference. Preferred etchants for the release etch are gas phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise additional gas components such as $N_2$ or an inert gas (Ar, Xe, He, etc.). In this way, the remaining sacrificial material is removed and the micromechanical structure is released. In one aspect of such an embodiment, $XeF_2$ is provided in an etching chamber with diluents (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $SCCO_2$, or super critical $CO_2$ (the use of super critical $CO_2$ as an etchant is described in U.S. patent application Ser. No. 10/167,272, now U.S. Pat No. 6,958,123, issued Oct. 25, 2005, which is incorporated herein by reference). Of course, the etchants and methods selected should be matched to the sacrificial materials being removed and the desired materials being left behind.

It will be appreciated by those of skill in the art that a new and useful spatial light modulator has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. In particular, each of the layers of the structure layers, such as micromirror plate layer 300 (which may further comprises layers 301, 303, 305 and 307 as shown in FIG. 6B), hinge support layers 340 and 350, and hinge layer 360 may comprise one or more of a number of suitable materials that are either electro-conducting or electro-insulating, as long as at least one of the layers is electro-conducting and provides electro-contact to the micromirror. In another example, the Sandia SUMMiT process (using polysilicon for structural layers) or the Cronos MUMPS process (also polysilicon for structural layers) could be used in the present invention. Also, a MOSIS process (AMI ABN—1.5 um CMOS process) could be adapted for the present invention, as could a MUSiC process (using polycrystalline SiC for the structural layers) as disclosed, for example, in Mehregany et al., Thin Solid Films, v. 355-356, pp. 518-524, 1999. Also, the sacrificial layer and etchant disclosed herein are exemplary only. For example, a silicon dioxide sacrificial layer could be used and removed with HF (or HF/HCl), or a silicon sacrificial could be removed with $ClF_3$ or $BrF_3$. Also a PSG sacrificial layer could be removed with buffered HF, or an organic sacrificial such as polyimide could be removed in a dry plasma oxygen release step. Of course the etchant and sacrificial material should be selected depending upon the structural material to be used. Also, though PVD and CVD are referred to above, other thin film deposition methods could be used for depositing the layers, including spin-on, sputtering, anodization, oxidation, electroplating and evaporation. Therefore, the invention as described herein contemplates all such embodiments as may come within the scope of the following claims and equivalents thereof.

We claim:

1. A spatial light modulator comprising an array of micromirror devices, each micromirror device comprising:
   a substrate;
   a deformable hinge held on the substrate;
   a micromirror plate attached to the deformable hinge such that the micromirror plate is configured to move on the substrate between an ON state and an OFF state, wherein the OFF state corresponds to a position wherein the micromirror plate has a non-zero OFF state angle to the substrate;
   an ON state stopper disposed so as to abut against and stop a rotation of the micromirror plate at the ON state;
   wherein an OFF state stopper is absent from the micromirror device such that the micromirror plate at the OFF state does not abut against a stopper, and such that there is a gap between outside edges of the micromirror plate and any adjacent structures; and
   an electrode associated with the micromirror plate for deflecting the micromirror plate.

2. The spatial light modulator of claim 1, wherein the deformable hinge is a torsion hinge.

3. The spatial light modulator of claim 2, wherein the micromirror plate is configured to move between the ON and OFF state in response to a set of image data derived from a pulse-width-modulation.

4. The spatial light modulator of claim 2, wherein each electrode is connected to one of an array of memory cells.

5. The spatial light modulator of claim 4, wherein the memory cells are SRAMs.

6. The spatial light modulator of claim 4, wherein each memory cell stores a voltage determined according to a set of image data derived from a pulse-width-modulation.

7. The spatial light modulator of claim 2, wherein the OFF state angle is at least 1 degrees relative to the substrate.

8. The spatial light modulator of claim 2, wherein the OFF state angle is at least 2 degrees relative to the substrate.

9. The spatial light modulator of claim 2, wherein the OFF state angle is at least 3 degrees relative to the substrate.

10. The spatial light modulator of claim 2, wherein the deformable hinge is part of a hinge support structure that holds the micromirror plate on the substrate, wherein the hinge support structure is a multilayer structure that has a curved state, due to stress differences between the layers, when the micromirror plate is not electrostatically deflected.

11. The spatial light modulator of claim 2, wherein the micromirror plate is disposed in a plane separate from the deformable hinge.

12. The spatial light modulator of claim 2, wherein the micromirror plate is attached to the deformable hinge such that the micromirror plate is configured to rotate along a rotation axis that is parallel to, but off-set from the diagonal of the micromirror plate when viewed from above.

13. The spatial light modulator of claim 2, wherein the micromirror plate is attached to the deformable hinge at an attachment that is substantially away from the center of the micromirror plate.

14. The spatial light modulator of claim 2, wherein the micromirror plate is attached to the deformable hinge at an attachment that is substantially at the center of the micromirror plate.

15. The spatial light modulator of claim 1, wherein the deformable hinge is disposed on an opposite side of the micromirror plate from the substrate.

16. The spatial light modulator of claim 2, wherein the substrate is a substrate transmissive to visible light.

17. The spatial light modulator of claim 16, wherein a second substrate having electrodes and circuitry thereon is positioned proximate to the substrate transmissive to visible light for electrostatically deflecting the micromirror devices.

18. The spatial light modulator of claim 16, wherein the micromirror plate is substantially square.

19. The spatial light modulator of claim 12, wherein the axis of rotation is located 0.5 micrometers or more away from the micromirror plate diagonal.

20. The spatial light modulator of claim 2, wherein an edge of the micromirror plate is covered by a light absorbing material.

21. The spatial light modulator of claim 1, wherein the spatial light modulator is part of a projection system for forming an image on a target.

22. The spatial light modulator of claim 2, wherein the substrate is a glass or quartz substrate.

23. The spatial light modulator of claim 22, wherein a surface of the substrate is covered with an anti-reflection film.

24. The spatial light modulator of claim 2, wherein the micromirror plate is held on the substrate by one or more posts that connect the deformable hinge to the substrate.

25. The spatial light modulator of claim 2, wherein the substrate is a semiconductor substrate.

26. The spatial light modulator of claim 2, wherein the micromirror plate has a diagonal length of 25 microns or less.

27. The spatial light modulator of claim 2, wherein the deformable hinge comprises a nitride of titanium and/or silicon.

28. A projection system for producing an image, comprising:
   a light source for producing light;
   a spatial light modulator for modulating the light according to a set of image data derived from the image, wherein the spatial light modulator comprises an array of micromirror devices, each micromirror device comprising
      a deformable hinge disposed on a substrate,
      a micromirror plate attached to the deformable hinge such that the micromirror plate is configured to move between an ON state and an OFF state, wherein the OFF state corresponds to a position wherein the micromirror plate has a non-zero OFF state angle to the substrate, and wherein an OFF state stopper is absent from the micromirror device such that the micromirror plate at the OFF state does not abut against a stopper, and such that there is a gap between outside edges of the micromirror plate and any adjacent structures;
   condensing optics for directing the light onto the spatial light modulator; and
   projection optics for projecting the modulated light on a screen.

29. The projection system of claim 28, wherein the image data are derived from the image according to a pulse-width-modulation.

30. A method comprising:
providing a spatial light modulator comprising an array of micromirror devices, each of which comprises:
a substrate;
a deformable hinge held on the substrate;
a reflective and deflectable mirror plate attached to the deformable hinge such that the mirror plate is configured to move relative to the substrate; and
an addressing electrode associated with the mirror plate for moving the mirror plate; and
moving the mirror plate between ON and OFF states so as to modulate a beam of light, further comprising:
moving the mirror plate to the OFF state where the mirror plate has a non-zero angle to the substrate, wherein the mirror plate does not abut against a stopper, and wherein there is a gap between outside edges of the mirror plate and any adjacent structures; and
moving the mirror plate to the ON state where the mirror plate abuts against a stopper.

31. The method of claim 30, wherein the step of moving the mirror plate between the ON and OFF states is performed in response to a stream of image data derived from a pulse-width-modulation.

32. The method of claim 31, wherein the mirror plate is −2 degrees or more relative to the substrate.

33. The method of claim 31, wherein the mirror plate is −3 degrees or more relative to the substrate.

34. The method of claim 30, wherein the deformable hinge is part of a hinge support structure that holds the mirror plate on the substrate, wherein the hinge support structure is a multilayer structure that has a curved state, due to stress differences between the layers, when the mirror plate is not electrostatically deflected.

35. The method of claim 30, wherein the mirror plate is disposed in a plane separate from the deformable hinge.

36. The method of claim 30, wherein the mirror plate is attached to the deformable hinge such that the mirror plate is configured to rotate along a rotation axis that is parallel to, but off-set from the diagonal of the mirror plate when viewed from above.

37. The method of claim 30, wherein the substrate is a substrate transmissive to visible light.

38. The method of claim 37, wherein a second substrate having electrodes and circuitry thereon is positioned proximate to the substrate transmissive to visible light for electrostatically deflecting the micromirrors.

39. The method of claim 30, wherein the substrate is a semiconductor substrate.

40. The method of claim 30, wherein the mirror plate has a diagonal length of 25 microns or less.

* * * * *